United States Patent
Thompson

(10) Patent No.: US 8,804,762 B2
(45) Date of Patent: Aug. 12, 2014

(54) METHOD AND SYSTEM FOR TIMESTAMP INCLUSION IN VIRTUAL LOCAL AREA NETWORK TAG

(75) Inventor: Geoffrey O. Thompson, Mountain View, CA (US)

(73) Assignee: Avaya Inc., Basking Ridge, NJ (US)

( * ) Notice: Subject to any disclaimer, the term of this patent is extended or adjusted under 35 U.S.C. 154(b) by 850 days.

(21) Appl. No.: 12/640,497

(22) Filed: Dec. 17, 2009

(65) Prior Publication Data

US 2011/0149998 A1    Jun. 23, 2011

(51) Int. Cl.
*H04J 3/24* (2006.01)

(52) U.S. Cl.
USPC .................... 370/474; 370/389; 370/471

(58) Field of Classification Search
USPC .......................... 370/289, 471, 474
See application file for complete search history.

(56) References Cited

U.S. PATENT DOCUMENTS

| 8,166,216 B1* | 4/2012 | Kondapalli | 710/58 |
| 2004/0071469 A1* | 4/2004 | Baldine et al. | 398/79 |
| 2005/0152406 A2* | 7/2005 | Chauveau | 370/503 |
| 2009/0190613 A1* | 7/2009 | Finn | 370/509 |
| 2010/0183021 A1* | 7/2010 | Cloonan et al. | 370/412 |
| 2010/0223399 A1* | 9/2010 | Kim et al. | 709/248 |

* cited by examiner

*Primary Examiner* — Jason Mattis
(74) *Attorney, Agent, or Firm* — Christopher & Weisberg, P.A.

(57) ABSTRACT

A method, system and apparatus time-stamp a data frame. The data frame includes a type field and data for transmission to a communication network. The data frame is received and a reception time for the data frame is determined. The value of the type field is determined. If the value of the type field indicates the data frame is a time-stamped frame, a timestamp field is inserted in the data frame. The timestamp field indicates the reception time.

17 Claims, 4 Drawing Sheets

METHOD AND SYSTEM FOR TIMESTAMP INCLUSION IN VIRTUAL LOCAL AREA NETWORK TAG

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a network communications and more specifically to a method and system for time-stamping an Ethernet packet and re-associating the timestamp to the packet being timed.

BACKGROUND OF THE INVENTION

Currently, discussions are underway within the Institute of Electrical and Electronics Engineers ("IEEE") to determine a new Timing and Synchronization for Time-Sensitive Applications in Bridged Local Area Networks standard for broadband communication, denoted as 802.1 as. As a result of these discussions, one of the issues presented to the physical layer of Ethernet defined according to IEEE standard 802.3 is how to the support time stamping requirements required under 802.1 as.

The current proposal from 802.1 as is to have a time stamp recorded in 802.3 station management for selected packets. However, how these packets are to be designated for time stamping is yet to be revealed. The current proposal under 802.1 as splits the timestamp from the actual packet being time stamped. The split produces significant problems with respect to re-associating the timestamp to the packet being timed. The association of the time stamp data and the packet is a complex post-processing task as bit-stuffing is generally considered to be an undesirable approach in high speed networks.

Therefore, what is needed is a system and method for time-stamping an Ethernet packet and re-associating the timestamp to the packet being timed.

SUMMARY OF THE INVENTION

The present invention advantageously provides a method and system for time stamping an Ethernet data frame. Generally, a value of a real time clock is captured when an Ethernet data frame is detected for transmission and timestamp header is inserted into the Ethernet data frame. Upon determining that the timestamp header includes a Time Stamp TType, the captured real time value is appended to the Ethernet data frame.

In accordance with one aspect of the present invention, a method is provided for time-stamping a data frame. The data frame includes a type field and data for transmission to a communication network. The data frame is received and a reception time for the data frame is determined. The value of the type field is determined. If the value of the type field indicates the data frame is a time-stamped frame, a timestamp field is inserted in the data frame. The timestamp field indicates the reception time.

In accordance with another aspect of the present invention, an apparatus for time-stamping an Ethernet data frame includes a reconciliation sublayer, a real time clock and a start frame delimiter. The Ethernet data frame includes a type field and data for transmission to a communication network. The reconciliation sublayer is operable to receive the Ethernet data frame. The real time clock is operable to determine a reception time for the Ethernet data frame. The start frame delimiter detector is communicatively coupled to the reconciliation sublayer and the real time clock. The start frame delimiter detector is operable to determine a value of the type field and if the value of the type field indicates the data frame is a time-stamped frame, insert a timestamp field in the Ethernet data frame. The timestamp field indicates the reception time.

In accordance with yet another aspect of the present invention, a system for time-stamping an Ethernet data frame includes a routing controller. The Ethernet data frame includes data for transmission. The routing controller is operable to receive the Ethernet data frame and determine a reception time for the Ethernet data frame and a value of the type field. If the value of the type field indicates the data frame is a time-stamped frame, the routing controller is further operable to insert a timestamp field in the Ethernet data frame. The timestamp field indicates the reception time.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
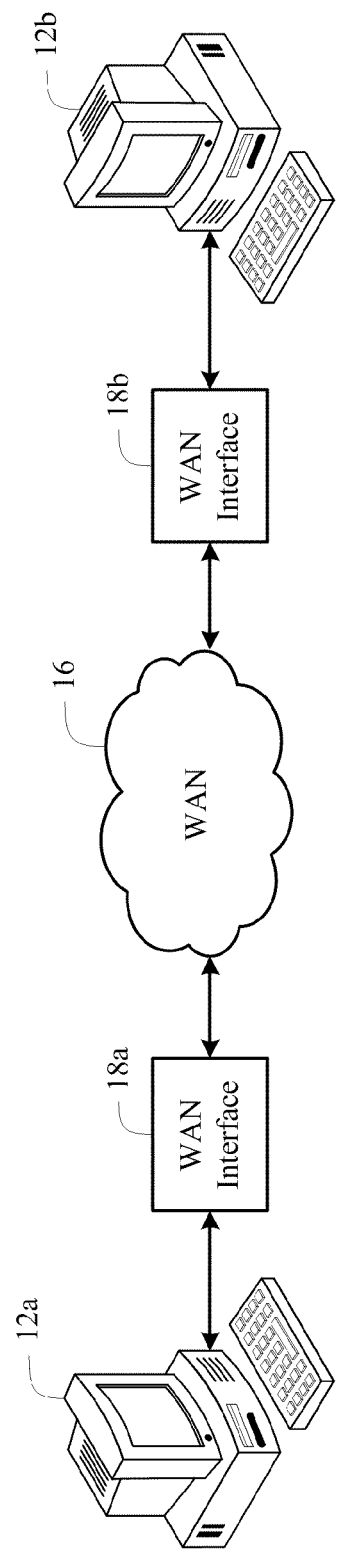
FIG. 1 is a block diagram of an exemplary Ethernet communication system constructed in accordance with the principles of the present invention.

Before describing in detail exemplary embodiments that are in accordance with the present invention, it is noted that the embodiments reside primarily in combinations of apparatus components and processing steps related to implementing a system and method for time-stamping an Ethernet packet and re-associating the timestamp to the packet being timed. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for time-stamping an Ethernet packet and re-associating the timestamp to the packet being timed.

Referring now to the drawing figures in which like reference designators refer to like elements, there is shown in FIG. 1 an exemplary network communication system 10. System 10 includes a first client computer 12a communicating with a second client computer 12b over a wide area network ("WAN") 16. Client computers 12a and 12b are referred to collectively herein as "client computer 12." The wide area network 16 may include the Internet, intranet, or other communication network. Client computers 12 may include personal computers, laptops, personal data assistants ("PDAs"), servers, mobile telephones, etc. Each client computer 12 transmits data through a WAN 16 via a WAN interface 18a, 18b (referenced collectively as "WAN interface 18"). Although the communication network is pictured in FIG. 1 as being a WAN, the principles of the present invention may also apply to other forms of communication networks, such as personal area networks ("PANs"), local area networks ("LANs"), campus area networks ("CANs"), metropolitan area networks ("MANs"), etc. Additionally, although FIG. 1 shows two client computers 12, this configuration is for exemplary purposes only. For example, the system 10 may include multiple WAN interfaces 18. The WAN interface 18 can be implemented in or be in communication with various types of client devices, such as routers, switches, bridges, etc. Additionally, the WAN interface 18 may be a stand-alone device or may be embedded as part of another resource, such as the client computer 12.

Figure 2:
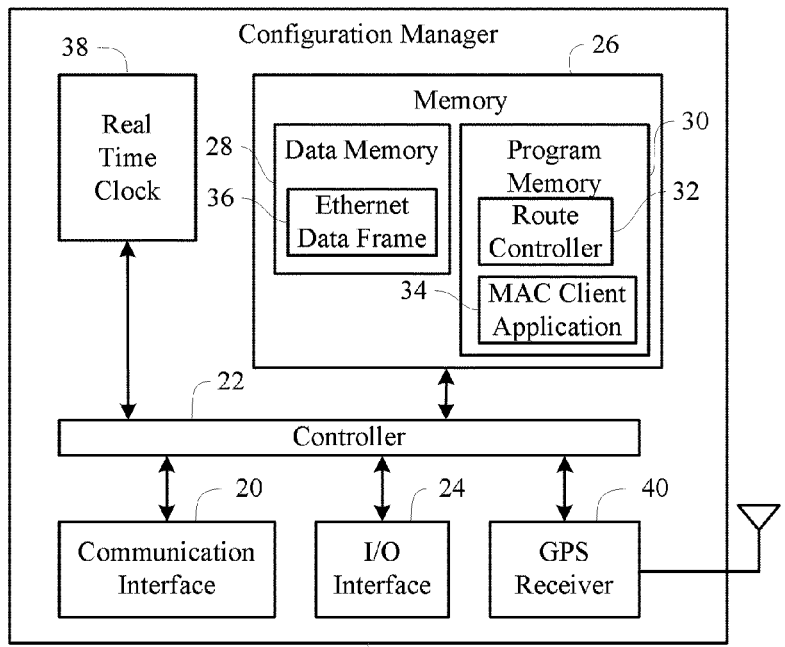
FIG. 2 is a block diagram of a client computer constructed in accordance with the principles of the present invention.

Referring now to FIG. 2, an exemplary client computer 12 may include a communication interface 20 communicatively coupled to a controller 22. The communication interface 20 may be wired, wireless, or any combination thereof. The communication interface 22 transfers data packets between the configuration manager 20 and the network nodes 12 using, at least, IEEE communication protocol 802.8, i.e. "Ethernet." The controller 22 controls the processing of information and the operation of the client computer 12 in a well-known manner. The controller 22 is also coupled to an input/output interface 24 and a memory 26. The input/output interface 24 controls the reception and presentation of information to and from a user through various well-known peripheral devices such as a display screen, a keyboard, a mouse, a printer, etc.

The memory 26 may be volatile or non-volatile. The memory 26 includes a data memory 28 and a program memory 30. The program memory 30 contains a routing controller 32 and a Media Access Control ("MAC") client application 34, such as an 802.1 as application, the operation and interaction of which is discussed in more detail below. It should be noted that the routing controller 32 and/or MAC client 34 may be also embedded within the WAN interface 18 or other router, switch, or bridge (not shown). The data memory 28 stores various data files, such an Ethernet data frame 36 which is prepared and transmitted for routing through the network 10 by the routing controller 32. The client computer 12 may also include a real time clock 38 used to maintain a reference time signal. Alternatively, the client computer 12 may include a means for periodically receiving updates to adjust a clock in order to maintain a reference timeframe accurate to within a few microseconds, e.g., receiving updates through a Global Positioning System ("GPS") receiver 40 from a satellite having an atomic clock that maintains a continuous and stable time scale such as the International Atomic Time ("TAI"). Aside from getting a reference from a satellite, the reference can be distributed through the links that make up the network 10 from a master clock source.

Figure 3:
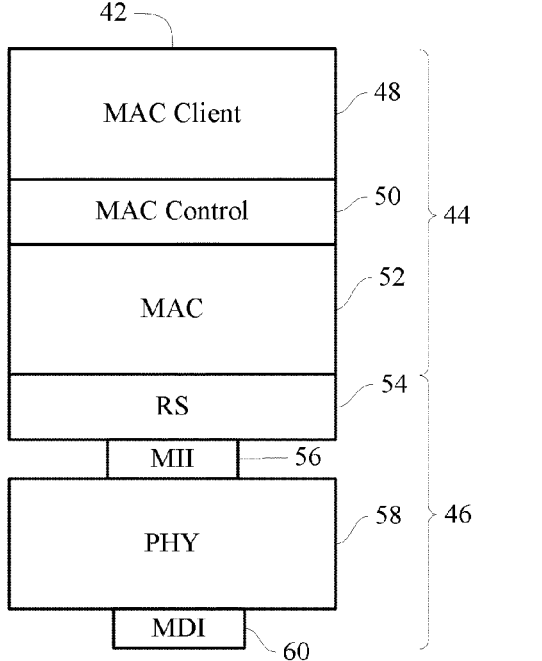
FIG. 3 is a block diagram illustrating an exemplary Ethernet frame structure for time-stamping the Ethernet data frame according to the principles of the present invention.

Referring now to FIG. 3, a diagram is provided which illustrates an exemplary Ethernet frame structure 42 used in the operation of an exemplary routing controller 32. The Ethernet frame structure 42 is a combination of the MAC layer 44, i.e. a Layer 2 sublayer, and the physical layer 46, i.e., Layer 1, of the commonly known seven layer Open System Interconnection ("OSI") reference model. The MAC layer 44 includes a logical link control ("LLC") or other MAC client sublayer 48, a MAC Control sublayer 50 and a MAC sublayer 52. In one embodiment of the present invention, the MAC sublayer 52 is an 802.3 MAC that supports time stamping. The physical layer 46 includes a reconciliation sublayer 54, a media independent interface 56, a physical sublayer 58 and a medium dependent interface 60. The operation of the Ethernet frame structure 42 is commonly known in the art.

Figure 4:
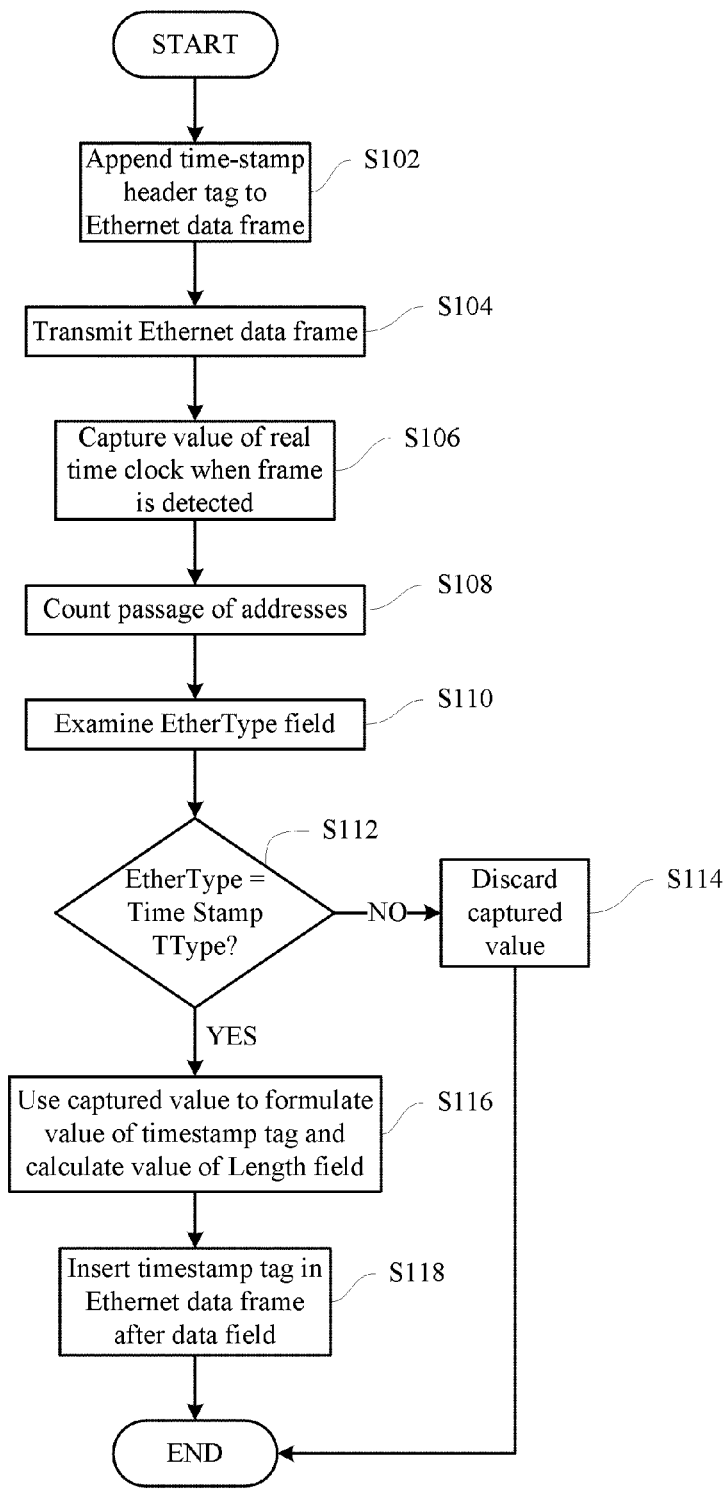
FIG. 4 is a flow chart of an exemplary time-stamping process according to the principles of the present invention.
Figure 5:
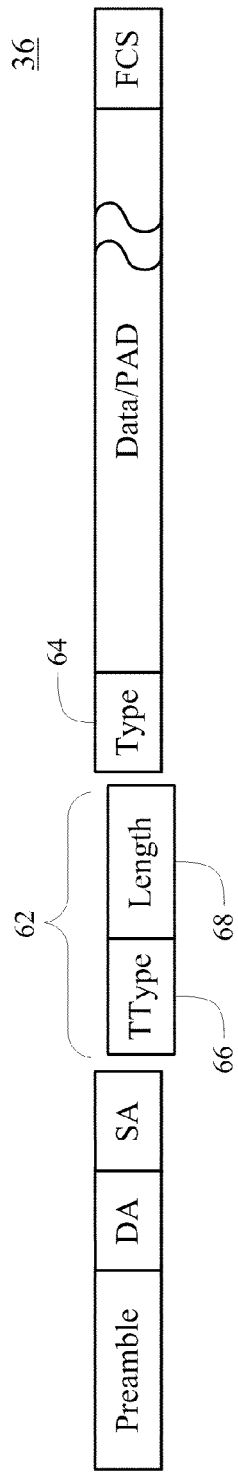
FIG. 5 is an exemplary Ethernet data frame to be time-stamped according to the principles of the present invention.

Referring now to FIG. 4, an exemplary operational flowchart is provided that describes the process performed by the routing controller 32 to time-stamp an Ethernet data frame 36 by entering a time-stamp header tag into the data frame 36. An exemplary Ethernet data frame 36 indicating a header tag 62 insertion point is shown in FIG. 5. When a MAC client application 34 is to generate time stamp information for a particular data frame 36, MAC client application 34 signals this request by appending a special time-stamp header tag 62 in front of the conventional EtherType field 64 (step S102). The time-stamp header tag 62 indicates that the Ethernet data frame 36 is to be time-stamped. Time-stamp header tag 62 includes a Type/Control field 66 ("TType") and a Length field 68.

When a packet 36 passes through the reconciliation sublayer 54 as it is being transmitted by the MAC sublayer 52 (step S104), a special start frame delimiter ("SFD") detector 74 captures the value of the real time clock 38 when the frame, e.g., the frame preamble, is detected (step S106). The SFD detector 74 counts the passage of 12 octets (step S108), i.e., the addresses, and examines the value of the EtherType field 64 (step S110). If the EtherType value is anything other than a "Time Stamp" TType (step S112), the captured value is discarded (step S114) and the logic is reset to wait for the next packet. However, if the EtherType value is the "Time Stamp" TType (step S112), a trailer timestamp tag process is initiated. The captured real time clock value is used to formulate the value of the timestamp tag 70 (step S116). The value of the Length field 68 is precisely determined as the octet count at which the trailer timestamp tag 70 is to be added to the end of the data stream 72 (step S118).

Figure 6:
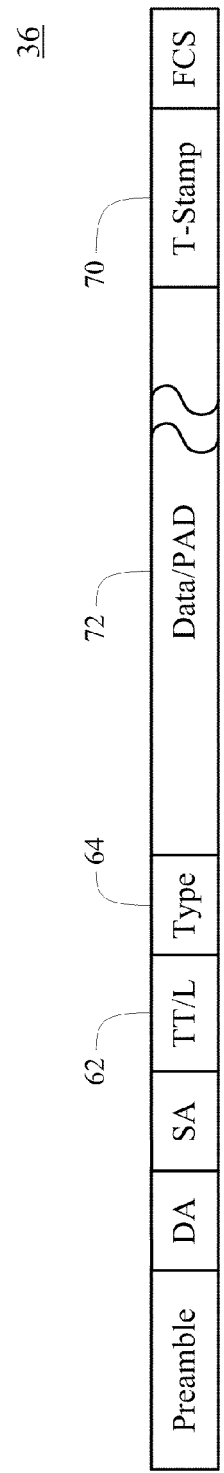
FIG. 6 is an exemplary time-stamped data frame constructed in accordance with the principles of the present invention.

FIG. 6 illustrates an Ethernet data frame 36 which has been time stamped in accordance with the principles of the present invention. The TType field 66 in header tag 62 identifies the data frame 36 as including a timestamp field 70 and the value of Length field 68 precisely identifies the location of the timestamp field 70 within the Ethernet data frame 36. The timestamp field 70 may be located after the data field 72 and any optional or needed padding.

It is noted that two different variants of the above step may be applied to cover the two different cases of MAC transmission, i.e. (a) where a cyclic redundancy check ("CRC") is generated in MAC transmit hardware and (b) where the CRC is handed down within the frame structure from the MAC Client 48.

It is also noted that complete Time Stamping also uses a complementary process in the receiving MAC client 34 in which a similar detection mechanism is used on the receive side. The complimentary process may append a second trailer timestamp tag 70 to the Ethernet data frame 36 having the receive side time stamp upon reception.

To retrieve the timestamp, the requesting MAC client recognizes that the Ethernet data frame 36 includes a "Time Stamp" TType, count the number of octets from the end of the Length field 68 to the timestamp tag 70 that is indicated by the value of the length field 68, and retrieve the timestamp tag 70 value at the designated location. It is foreseeable that the length value may not be limited to octets and may be expressed in any other data count denomination, such as bits or bytes.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for time-stamping a data frame, the data frame including a type field and data for transmission to a communication network, the method comprising:
   receiving the data frame;
   determining a reception time for the data frame;
   determining a value of the type field, the type field indicating whether the data frame is a time-stamped frame;
   responsive to determining that the value of the type field indicates the data frame is a time-stamped frame;
      calculating a length value, the length value indicating a length from an end of a length field to a start of a time stamp field, the length value including a length of the type field and a length of a data payload field containing the data, the length value indicating the position of the timestamp field;
      inserting the length field in the data frame prior to the data and prior to the type field, the length field including the length value; and
      inserting the timestamp field at a position in the data frame after the length field, the timestamp field, the timestamp field indicating the reception time.

2. The method of claim 1, wherein the data frame is an Ethernet data frame.

3. The method of claim 2, wherein the timestamp field is positioned immediately following the data.

4. The method of claim 2, further comprising transmitting the Ethernet data frame to the communication network.

5. The method of claim 2, further comprising inserting a header tag in the Ethernet data frame, the header tag including at least a timestamp type.

6. The method of claim 2, wherein the Ethernet data frame is received at a reconciliation sublayer.

7. The method of claim 2, further comprising responsive to determining that the Ethernet data frame is not a time-stamped frame, ignoring the reception time.

8. An apparatus for time-stamping an Ethernet data frame, the Ethernet data frame including a type field and data for transmission to a communication network, the apparatus comprising:
   a reconciliation sublayer configured to receive the Ethernet data frame;
   a real time clock configured to determine a reception time for the Ethernet data frame; and
   a start frame delimiter detector communicatively coupled to the reconciliation sublayer and the real time clock, the start frame delimiter detector configured to:
      determine a value of the type field, the type field indicating whether the data frame is a time-stamped frame; and
      responsive to determining that the value of the type field indicates the data frame is a time-stamped frame:
         calculate a length value, the length value indicating a length from an end of a length field to a start of a timestamp field, the length value including a length of the type field and a length of a data payload field containing the data, the length value indicating the position of the timestamp field;
         insert the length field in the Ethernet data frame immediately prior to the type field, the length field including the length value; and
         insert the timestamp field at a position in the Ethernet data frame after the length field, the timestamp field indicating the reception time.

9. The apparatus of claim 8, wherein the timestamp field is positioned immediately following the data.

10. The apparatus of claim 8, further comprising a communication interface configured to transmit the Ethernet data frame to the communication network.

11. The apparatus of claim 8, further comprising a Media Access Control ("MAC") sublayer in communication with the reconciliation sublayer and the start frame delimiter detector, the MAC sublayer configured to insert a header tag in the Ethernet data frame, the header tag including at least a timestamp type and a length field.

12. The apparatus of claim 8, wherein responsive to determining that the Ethernet data frame is not a time-stamped frame, the start frame delimiter detector is further configured to ignore the reception time.

13. A system for time-stamping an Ethernet data frame, the Ethernet data frame including data for transmission, the system comprising:
   a routing controller configured to:
      receive the Ethernet data frame, the Ethernet data frame having a type field;
      determine a reception time for the Ethernet data frame;
      determine a value of the type field, the type field indicating whether the data frame is a time-stamped frame; and responsive to determining that the value of the type field indicates the data frame is a time-stamped frame:
calculate a length value, the length value indicating a length from an end of a length field to a start of a timestamp field, the length value including a length of the type field and a length of a data payload field containing the data, the length value indicating the position of the timestamp field;
insert the length field in the Ethernet data frame immediately prior to the type field, the length field including the length value; and
insert the timestamp field at a position in the Ethernet data frame after the length field, the timestamp field indicating the reception time.

14. The system of claim 13, wherein the timestamp field is positioned immediately following the data.

15. The system of claim 13, further comprising a communication interface in communication with the routing controller, the communication interface configured to transmit the Ethernet data frame.

16. The system of claim 13, wherein the routing controller includes:
a reconciliation sublayer configured to receive the Ethernet data frame; and
a Media Access Control ("MAC") configured to insert a header tag in the Ethernet data frame, the header tag including at least a timestamp type and a length field.

17. The system of claim 13, wherein responsive to determining that the Ethernet data frame is not a time-stamped frame, the routing controller is further configured to ignore the reception time.

* * * * *